(No Model.)

H. H. THORP.
BICYCLE.

No. 478,770.   Patented July 12, 1892.

Witnesses
R. B. Moerr
Al. J. Symes Jr.

Inventor
H. H. Thorp
by H. T. Fisher Attorney

UNITED STATES PATENT OFFICE.

HENRY H. THORP, OF CLEVELAND, OHIO.

BICYCLE.

SPECIFICATION forming part of Letters Patent No. 478,770, dated July 12, 1892.

Application filed August 25, 1891. Serial No. 403,643. (No model.)

*To all whom it may concern:*

Be it known that I, HENRY H. THORP, a citizen of the United States, residing at Cleveland, in the county of Cuyahoga and State of Ohio, have invented certain new and useful Improvements in Bicycles; and I do hereby declare that the following is a full, clear, and exact description of the invention, which will enable others skilled in the art to which it appertains to make and use the same.

My invention relates to improvements in bicycles; and its object is to provide a bicycle with a safety attachment adapted to prevent accidental tilting or falling of the bicycle to either side when under way and to afford a lateral stay or support when the bicycle is at rest and the rider is mounted.

To this end the invention consists in a safety attachment for bicycles fixed on the main frame thereof and adapted to swing to either side of the wheels, according as the tendency may be to incline to one side or the other, the safety-arm in the attachment being so arranged and connected as to always swing to the side of danger, all substantially as shown and described, and particularly pointed out in the claims.

Figure 1:
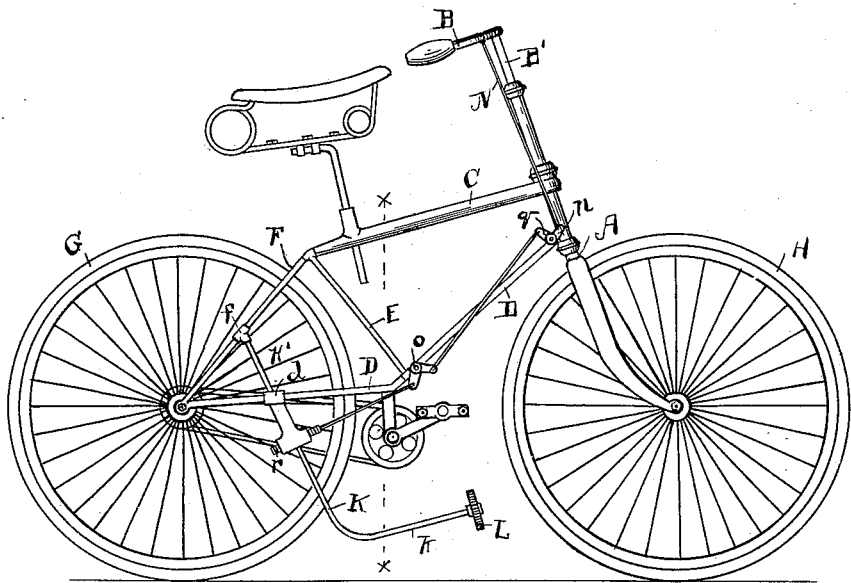
Figure 3:
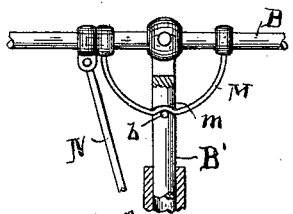
Figure 2:
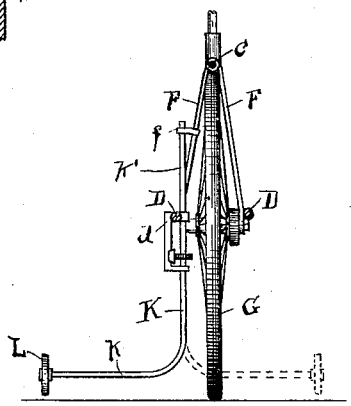
Figure 2:
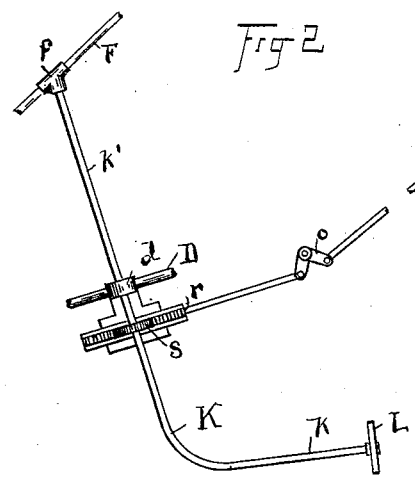

In the accompanying drawings, Figure 1 is a side elevation of a bicycle embracing my invention. Fig. 2 is an enlarged elevation, partly in section and partly broken away in places, of the novel attachments and the parts to and with which they are connected. Fig. 3 is an elevation, reduced, taken about on line *x x*, Fig. 1, looking to the rear and showing the lateral safety-arm in full lines on one side in safety position and in dotted lines on the other side in like position, the frame of the vehicle being all removed except the portion to which the arm is attached.

In Fig. 1 I show a well-known style or variety of bicycle, and in so far as this vehicle has heretofore been known and used I lay no claim to novelty, but confine myself to the improved attachment which constitutes my invention and to certain modifications and combinations hereinafter fully described. It will also be understood that while a certain well-known form of vehicle has been chosen with which to illustrate the invention it does not follow that the attachment is only adapted to this form. On the contrary, it may be employed upon all the more commonly-known styles of bicycles that have come under my notice by merely making the necessary modifications in the means of connecting the same thereto, and it is designed that the attachment shall have utility and adaptability on this class of vehicles generally. The old parts referred to, among others, are the front fork A, handle-bar B, supported on standard B' on said fork and modified to this invention, saddle-rod C, frame braces or pieces D E F, and wheels G and H.

My improvement begins with the rod or bar K, bent below its middle portion at nearly or quite right angles, so as to form when secured in position on the vehicle substantially as shown a forwardly-projecting arm *k* and a standard portion *k'*, by or through which the rod is held in operating position. This standard or upright portion of the bar or rod K is supported in suitable brackets *d* and *f*, fixed on the frame D F in such relation thereto that the standard portion of rod K will be at an angle to a vertical plane, and in which the said standard is adapted to turn axially. On the front of the arm *k* is a small wheel L. It will be seen that by supporting the bar K at an angle to a vertical plane, as shown and described, and by forming said rod, as shown, the front end of the arm K will be normally at considerable elevation behind the front wheel and wheel L will be raised a considerable distance from the ground, and it will also be seen that by reason of this construction of the said rod K and its arrangement of bearings the said wheel L will swing down laterally, so as to touch the ground, when it is turned at right angles to the tread of the vehicle, as shown in Fig. 3, and when slight tilting of the wheel to that side occurs. It is not designed that the wheel L shall touch the ground when the vehicle is upright, although the said wheel be swung laterally, as in Fig. 3; but the purpose is to have it touch when there is a slight inclination and such as might result in a fall if the said wheel were not interposed to prevent it. Then when the vehicle is again erected, though the wheel L still be at one side, it will be free from the ground and not running thereon, so as to produce possible side draft and retard the movements of the machine. It will, however, be immediately righted by the rider when he gains his equilibrium and restores handle B to normal position. Now in order that the arm $k$ will turn instantly to the side of danger and afford the protection for which it is designed, I provide mechanism for operating said arm from the handle-bar B. This bar is chosen as the initial point in the mechanism, because I propose to turn the instinct of the rider into account in balancing the machine. If for any reason the equilibrium of the human body be disturbed, the arms are the natural medium to restore it to a balanced position, and the movement of the arms is not dependent on the intellect, but occurs instinctively and always in the right way. Now, finding that the rider of a bicycle through his hands on the handle-bar exercises the same natural movements in his effort to maintain his equilibrium on the wheel, I have purposely pivoted said bar so that it may move up or down responsively with these instinctive movements of the rider. Then to give these movements expression in the safety-arm $k$ and to cause said arm to instantly swing to the proper side to afford protection, I have connected the said arm and the handle-bar by suitable mechanism. Thus the handle-bar has bow M, with a depression at its center adapted to lock temporarily on a projection $b$ on the standard B', and the handle-bar is thereby locked sufficiently for all ordinary use, but is free enough to respond to a sudden lurch of the wheel or the like in instant danger, when the said bar will swing on its pivot and go up on one side and down on the other, according to the pressure exerted by the rider. On the handle-bar at one side of its pivot a sufficient distance is attached a rod N, connected to a bell-crank lever $n$, fixed on the frame at or near the head of the yoke A. This bell-crank is connected to a second bell-crank $o$ by a rod $q$, and a rack-bar $r$ is operated by crank $o$, and in turn operates a wheel $s$, fixed on the standard portion of rod $k$ in the bracket $d$. The rod K is held to turn in the bearings provided by brackets $d$ and $f$, as hereinbefore described, and the chain of mechanism by which it is turned is positive in its action. Hence when the rider depresses the handle on the danger side it will throw the arm $k$ and its wheel instantly out on that side, and thus prevent tilting to a dangerous extent, and the reverse movement of the handle from its normal position will throw the said arm to the opposite side with like effect.

I do not, of course, consider my invention limited to the mechanism shown for effecting the movements I have described, because this mechanism might be considerably varied and yet serve the same purpose. I do, however, regard a pivoted handle-bar and suitable connecting mechanism extending to and operating the safety attachment or arm when the said bar is tilted on its pivot as essential and valuable parts of the invention. The broad idea of the invention is embraced in the utilization of the instinctive pressure on the handle-bar by the rider to right himself and his wheel, and any mechanism that accomplishes this result is understood as being included herein. The safety-arm is so connected and arranged that it makes only a quarter-turn to either side which is at right angles to the line of tread, and it may be swung to either side at will when it is desired to stop and rest the rider without dismounting.

Having thus described my invention, what I claim as new, and desire to secure by Letters Patent, is—

1. In a bicycle, the handle-bar pivotally supported on its standard, a laterally-swinging safety-arm, and operating mechanism connecting the handle-bar with said arm, substantially as described.

2. A bicycle provided with a pivoted arm arranged to swing laterally into safety position and mechanism connecting said arm with the handle-bar to turn said arm to either side, substantially as described.

3. A bicycle having a rod bent substantially at right angles and supported in bearings at an angle to a vertical plane, the lower portion of said rod serving as a safety-arm, in combination with a pivoted handle-bar and operating mechanism connecting said handle-bar and rod, substantially as described.

4. In a bicycle, a safety-arm having a standard portion supported in bearings on the bicycle-frame and arranged to swing at right angles to the line of movement, in combination with a pivoted handle-bar and mechanism connected with said bar, constructed to turn the said safety-arm to one side or the other, substantially as described.

5. The bicycle-frame, a safety attachment pivoted in bearings on said frame and having a forwardly-projecting arm, with a wheel on its extremity, in combination with a pivoted handle-bar and mechanism proceeding from said bar to turn said arm to one side or the other of the bicycle, substantially as described.

6. In a bicycle, a safety-arm supported in fixed bearings on the main frame and having a wheel at its front end, in combination with a pivoted handle-bar, a rack-bar operated thereby, and a pinion connected with said safety-arm, operated by said rack-bar, whereby said arm is turned laterally, substantially as described.

7. In a bicycle, a handle-bar pivotally supported on its standard and temporary locking mechanism connected with said bar, whereby the bar is held normally in horizontal position, and a safety device having connections extending to said handle-bar and operated thereby, substantially as described.

8. In a bicycle, a pivoted handle-bar having an attachment fixed thereon, constructed to lock the said bar temporarily in its normal position, in combination with a safety device supported on the bicycle-frame and mechanism constructed to throw said safety device into working position when the handle-bar is disengaged from its temporary lock, substantially as described.

Witness my hand to the foregoing specification this 7th day of August, 1891.

HENRY H. THORP.

Witnesses:
H. T. FISHER,
N. L. MCLANE.